April 10, 1928.
W. N. BIRNEY
1,665,340
AUTO TRUCK MECHANICAL DUMP HOIST
Filed Sept. 18, 1926  4 Sheets-Sheet 1
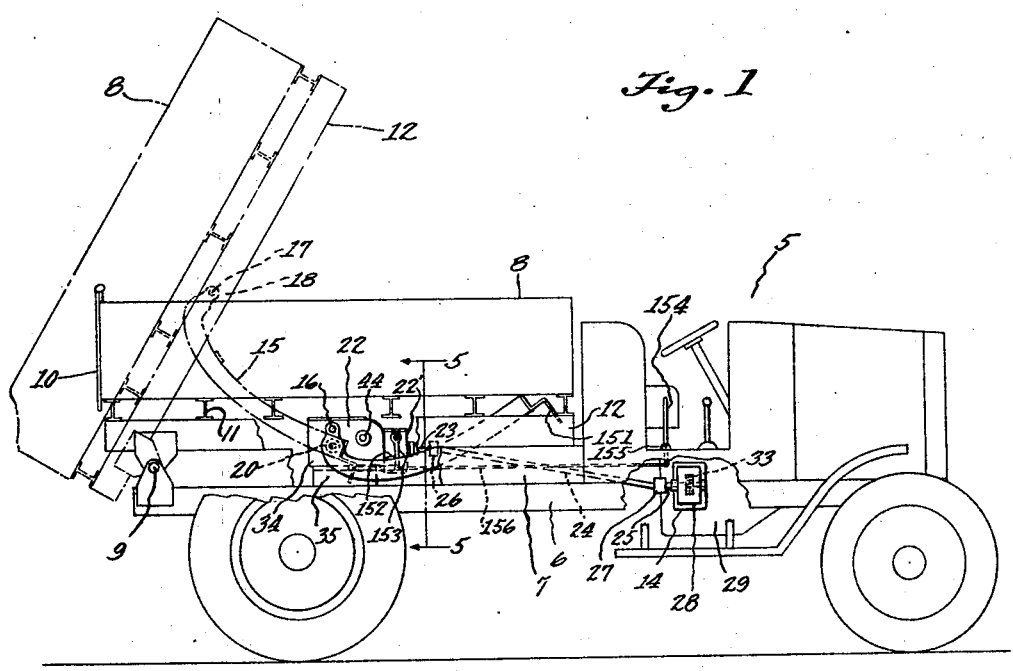

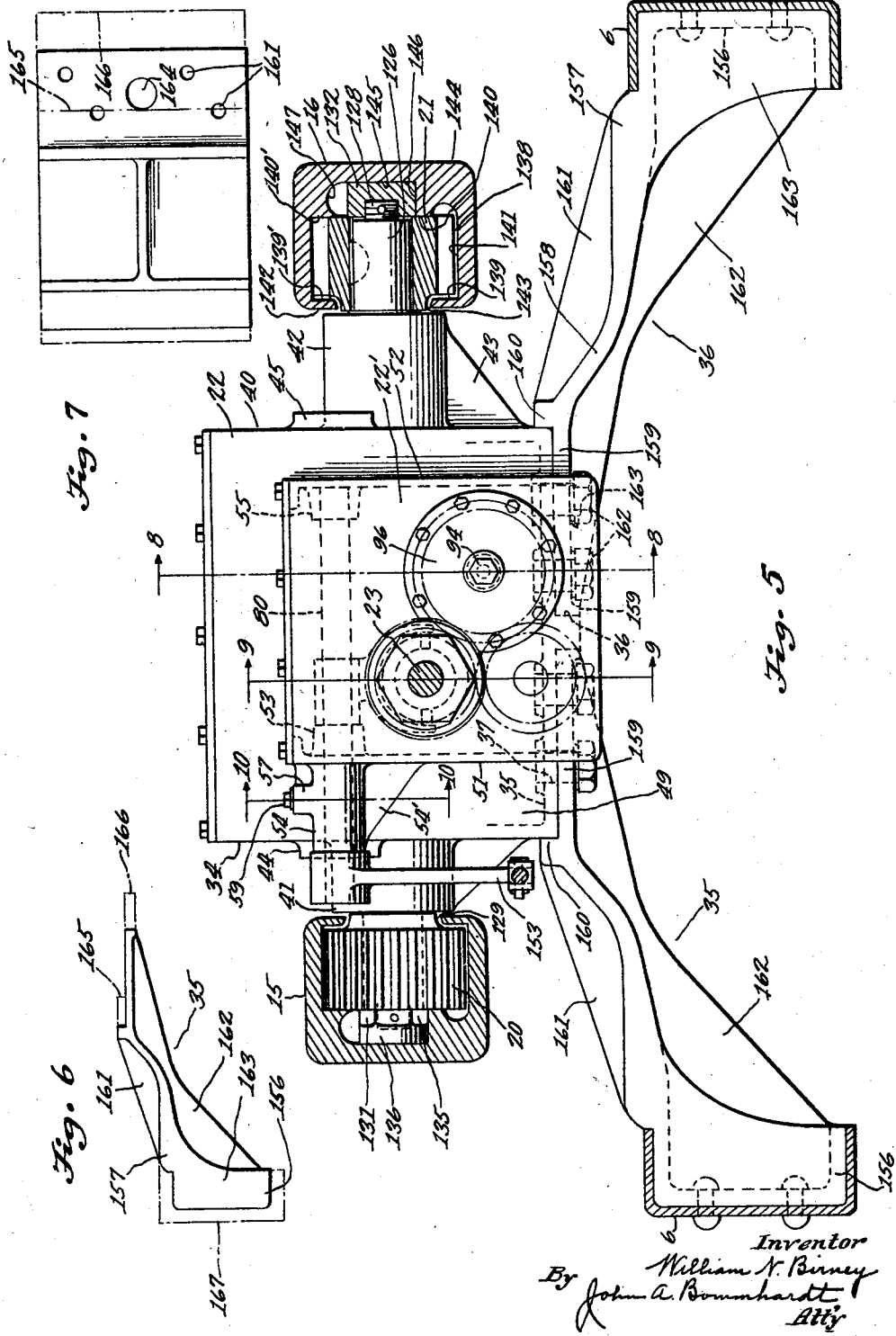

April 10, 1928.
W. N. BIRNEY
1,665,340
AUTO TRUCK MECHANICAL DUMP HOIST
Filed Sept. 18, 1926
4 Sheets-Sheet 3
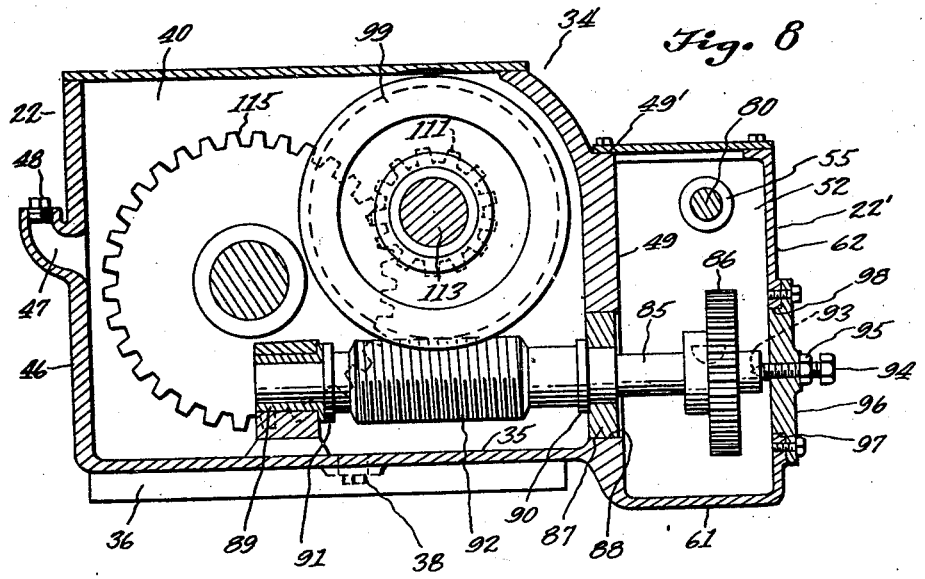
Fig. 8
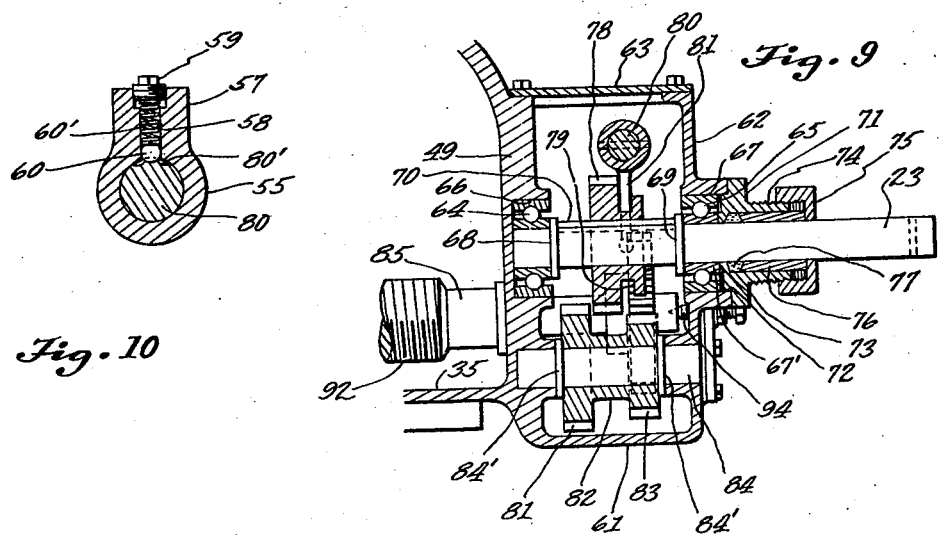
Fig. 9
Fig. 10
Inventor
William N. Birney
By John A. Bommhardt
Att'y

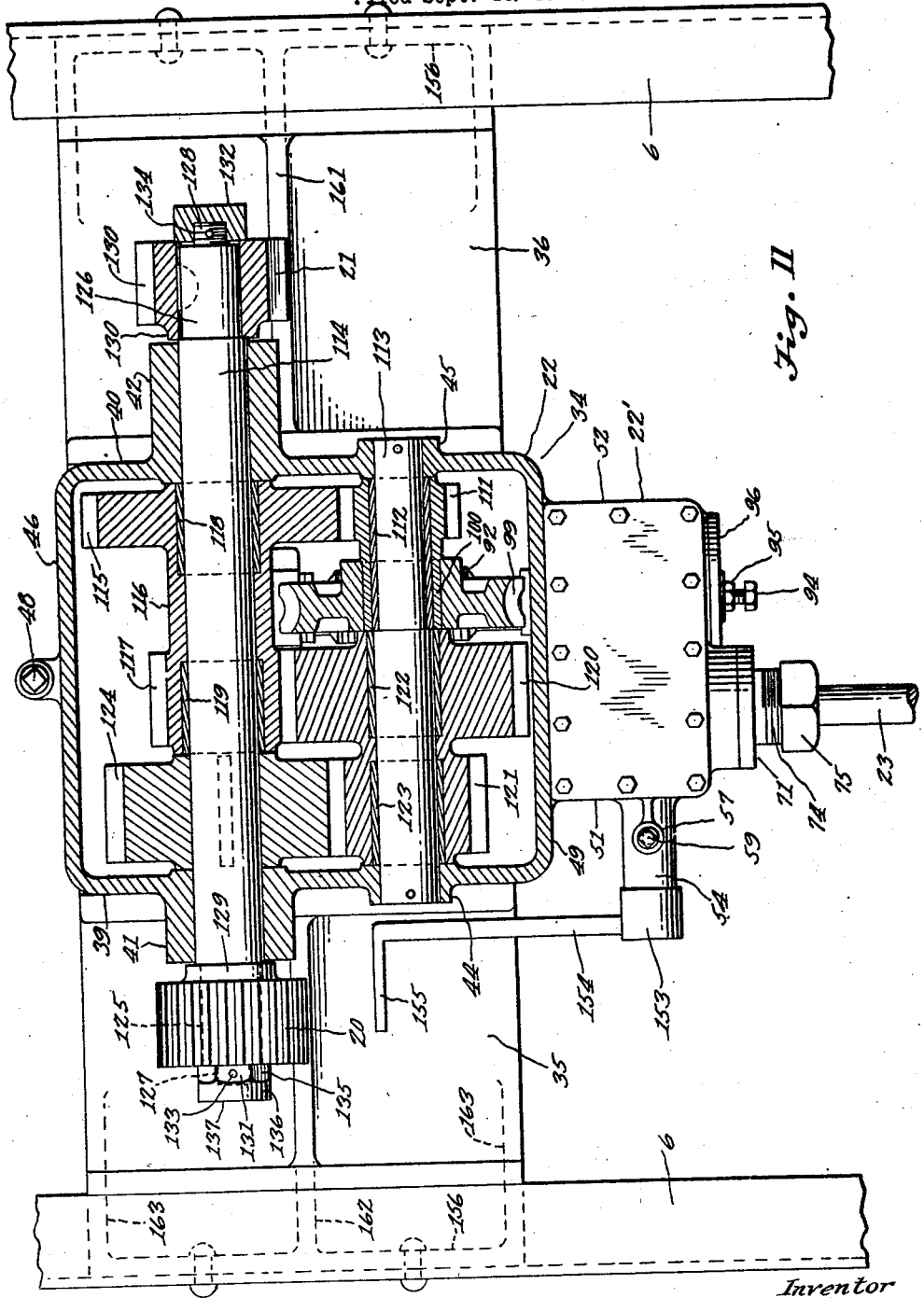

Patented Apr. 10, 1928.

1,665,340

UNITED STATES PATENT OFFICE.

WILLIAM N. BIRNEY, OF WILLOUGHBY, OHIO, ASSIGNOR OF ONE-HALF TO MICHAEL H. McKENNA, OF CLEVELAND, OHIO.

AUTO TRUCK MECHANICAL DUMP HOIST.

Application filed September 18, 1926. Serial No. 136,339.

This invention relates to new and useful improvements in vehicle body hoists and more particularly auto truck mechanical dump hoists.

An object of the invention is to provide a strong improved compact inclosed dumping means for auto dump trucks, covering and protecting the gear and rack teeth on the rack and pinion type of dump body hoists.

Another object is to provide improved bracket means for mounting the dumping means on various sized chassis and chassis channel bars, avoiding the necessity of providing large stocks of varied sized brackets for different types and sizes of trucks.

A further object is to provide an improved compact power take off means for the dumping means, to be applied to various truck transmission.

Other objects and features of the invention will be hereinafter pointed out and described.

In the drawings:

Fig. 1 is a side view of an auto dump truck partly broken away showing the body dumping means.

Fig. 2 is a detail sectional view of the transmission power take off.

Fig. 3 is an enlarged detail view of a rack.

Fig. 4 is a section on line 4—4 of Fig. 3.

Fig. 5 is an enlarged sectional view on line 5—5 of Fig. 1.

Fig. 6 is a detail edge view of a bracket.

Fig. 7 is a plan view thereof.

Fig. 8 is a section on line 8—8 of Fig. 5.

Fig. 9 is a section on line 9—9 of Fig. 5.

Fig. 10 is a section on line 10—10 of Fig. 5.

Fig. 11 is a horizontal sectional view through the reduction gear housing.

Referring specifically to the drawings, 5 indicates generally an ordinary auto dump truck having chassis channel bars 6 on which are secured stringers 7 adapted to normally support the dump body 8 pivoted as at 9 on the rear end of the chassis channels 6 allowing the body to be raised or lowered for dumping purposes by improved elevating or tilting means to be hereinafter described.

The dump body 8 has a tail gate 10 hinged at the top and latched at the bottom thereof by suitable means, allowing when unlatched the load to discharge by sliding along the tilted body floor past the gate. The body 8 is suitably reinforced by transverse I-beams 11 and longitudinal side channels 12 adapted to set on stringers 7 and support the body when lowered.

The present invention provides improved manually started means for pivotally tilting or swinging the body to a load dumping angle of approximately 70° and automatically stopping, and lowering to load receiving position by manually starting and automatically stopping as shown in Fig. 1, the means comprising generally a pair of improved rack bars 15 each having an eye 16 pivotally connected on a fixed shaft 17 extending between the inner sides of body channels 12. Each rack 15 has internal rack teeth 19 meshing with and enclosing a driving pinion 20 and 21 respectively, of a reduction gear enclosed in box 22 and having a clutch in box 22' connected by driving shafts 23, 24, 25 and universal coupling 26 and 27 to the transmisison power take off indicated at 28 bolted to the truck engine transmission housing 29.

The improved compact power take off 28 comprises a casing 14 bolted to transmission housing 29 over an opening 30 provided therein, with the stub shaft 25 journalled in casing 14, the stub shaft 25 carrying a gear 33 disposed within the casing and extending through opening 30 meshing with a gear 31 of the engine transmission. Stub shaft 25 is connected by universal coupling 27, intermediate shaft 24, universal coupling 26 and stub shaft 23 to the clutch indicated generally at 22'.

The gear and clutch boxes 22 and 22' form a compact gear boxing indicated generally at 34 supported by improved brackets indicated at 35 and 36 suitably secured to chassis channels 6.

The gear boxing 34 comprises a casting having a bottom 35 with a central longitudinal disposed rib 36 on the bottom side thereof together with tapped bracket bolt holes 37 and a drain plug 38. The boxing side walls 39 and 40 are provided with journal bearings 41 and 42 respectively ribbed as at 43 and shaft bosses 44 and 45. The rear wall 46 has a lubricant filling neck 47 normally closed by a screw plug 48. The front wall 49 of the boxing 34 is formed inwardly at the top thereof and a cover closure 50 is bolted on walls 39, 40, 46 and 49 enclosing the reduction gears to be hereinafter described. The front wall 49 has an upper ledge 49' and is shaped inwardly at the top. The clutch box 22' is formed on housing front wall 49, having side walls 51 and 52 provided with bearings 53 and 55 respectively, the bearing 53 extending outwardly as at 54 and reinforced by a rib 54'. The bearing portion 54 is provided with a boss 57 having bore 58, the upper portion of which is enlarged and tapped to receive a screw threaded plug 59 for adjusting the compression of a spring 60' pressing a ball 60 into one of a plurality of notches 80' on a rocker shaft 80 journalled in bearings 53 and 55. The bottom wall is indicated at 61 and the front wall at 62. A cover closure 63 is bolted on walls 51, 52, 62 and wall ledge 49' enclosing the clutch to be hereinafter described.

The clutch mechanism comprises stub shaft 23 journaled in suitable ball bearings 64 and 65 mounted in bosses 66 and 67 in walls 49 and 62 respectively, the shaft extending forwardly through a stuffing box 71 secured on boss 67. The shaft 23 has thrust shoulders 68 and 69 engaging the bearings and a key 70 disposed between them. The stuffing box 71 has a shoulder 72 setting within boss 67 and a thrust extension 73 adapted to engage against the inner collar 67' of bearing 65 secured on shaft 23 preventing displacement of the shaft 23. The outer extension 74 of the stuffing box is externally threaded to receive a nut 75 forcing a sleeve 76 in the gland against the packing 77 about shaft 23. A gear 78, slidably mounted on shaft 23 between shoulders 68 and 69, has an annularly grooved extension 79, the groove receiving a yoke 81 secured on a rocker shaft 80 journaled in bearings 53 and 54. The rocker shaft 80 is actuated by means to be hereinafter described.

The gear 78, when moved rearwardly by yoke 81 through means to be hereinafter described is adapted to mesh with an idler gear 81 on a shaft 84 secured in walls 49 and 62. The idler gear 81 has an extension 82 connecting to a relatively smaller gear 83, and the gears are retained between collars 84' on shaft 84. The gear 83 meshes with a gear 86 keyed on a worm drive shaft 85 journaled in a bearing 87 mounted in an opening 88 in wall 49, the shaft 85 extending into the reduction gear housing and being journaled in a bearing 89 mounted on bottom thereof. The shaft 85 has thrust shoulders 90 and 91 engaging bearings 87 and 89 respectively and carries a worm gear 92 between the shoulders. The end of shaft 85 in the clutch box is formed with a central cone shaped socket 93 receiving the cone shaped end of a worm adjusting thrust bolt 94 screw threaded into a plate 96 and secured by a lock nut 95. The plate 96 has a shoulder 97 setting into an opening 98 in wall 62. The relatively large plate 96 and bearing 87 is provided to allow the worm gear to be inserted or removed.

The worm gear 92 meshes with a worm wheel 99 mounted on the reduced hub 100 of a pinion 111 having a bushing 112 and freely mounted on a fixed shaft 113 pinned in bosses 44 and 45. The pinion 111 meshes with an idler gear 115 mounted on a drive shaft 114 journaled in bearings 41 and 42. The gear 115 with an extension 116 carrying a pinion gear 117 is bushed as at 118 and 119 freely turning on shaft 114. The pinion 117 meshes with a gear 120 carrying a pinion gear 121, the gears 120 and 121 are bushed as at 122 and 123 freely turning on shaft 113. Pinion 121 meshes with gear 124 keyed on drive shaft 114, the reduced shaft ends 125 and 126 thereof projecting beyond bearings 41 and 42 and having further reduced threaded studs 127 and 128. Rack driving pinion gears 20 and 21 are keyed on shaft extensions 125 and 126 with the reduced gear hubs 129 and 130 bolting against the extension shoulders. The gears 20 and 21 are also secured by special nuts 131 and 132 screw threaded and pinned as at 133 and 134 on studs 127 and 128 respectively. The special nuts 131 and 132 each comprises an inner hexagonal portion 135 and an outer cylindrical portion 136 having a flat end 137.

The gears 20 and 21 mesh with the internal teeth 19 of the improved racks 15 which enclose the gears preventing dirt and stones from getting into and injuring the gear and rack. Each rack comprises an elongated body of substantially concave shape formed with a relatively short radius at the pivot eye 16 thereof and a gradually lengthening radius toward the rack end as shown in Figs. 1 and 3. As shown in Figs. 4 and 5 each rack has rack teeth 19 on the upper inner side of an internal gear travel slot 138 and the gear hub extends through a slot 143 provided in the inner side 142 of each rack, the gear nut extending into a groove 145 formed in the outer rack wall 144. The internal gear travel slot, hub slot and gear nut groove extend from adjacent the eye 16 to the opposite rack end. The lower groove wall 146 provides a ledge on which the cylindrical nut end 136 turns maintaining the pinion gear teeth in mesh with the rack teeth and clearing the pinion slot bottom 141. The roller nut clears the concave top 147 of groove 145. The pinion slot side walls 139, 139', 140, 140' retain the rack on the pinion laterally. The rack teeth 19 are terminated as at 148 adjacent the pivot eye and at 149 near the rack end which is closed as by plate 150. The rack design provides a strong rigid structure. The rack 15 is provided on the top side with a stop arm 152 and the plate 150 thereof has a hook shaped stop arm 151 for purposes to be hereinafter described.

The clutch rocker arm 80 carries a lever 153 with a rearwardly extending arm 154 having a trip finger 155 engageable by rack hook 151 at the limit of movement of the rack one way and by a rack arm 152 at the limit of movement the other way. The lever 153 is connected by a link 156 to the lower end of a lever 154' pivoted on a bracket 155' on the floor board adjacent the driver's seat.

The improved brackets for supporting the reduction gear and clutch boxes each comprises a substantially U-shaped portion 156 which is adapted to be fitted into the chassis channel 6 and securely riveted thereto. The bracket extends inwardly at the top as at 157 and is offset upwardly as at 158, the inward ends 159 of each pair of brackets extending adjacent to each other when assembled. A top shoulder 160 is provided at the top of each offset and a top central reinforcing rib 161 extends from the shoulder 160 to the top of base 156. A bottom central reinforcing rib 162 extends from the bottom of base 156 to the inner end 159. Reinforcing ribs 163 are also provided at the base sides. The gear housing is positioned upon the bracket ends 159 with the rib 36 between them and the housing sides 39 and 40 abutting shoulders 160 and secured by bolts 162 with lock washers 163 extending through bracket holes 161 and screw threaded into the boxing tapped holes 37. A hole 164 is provided in one of the brackets for the drain plug 38. The brackets are compact and strong and when cast are made large enough to be used when machined down, for different sizes of truck channels and spacing apart thereof, maintaining the spacing of the bracket ends equal to the width of housing rib 36 and eliminating the necessity of carrying large stocks of different sized brackets. As shown in Figs. 6 and 7, each bracket is cast with inward extra metal 165 at shoulder 160 and inward extra metal 166 at the inner bracket end 159. Extra metal 167 is also provided at the outer top, side and bottom of base 156. For different sized chassis channels the metal 167, is machined away allowing the base 156 to be snugly fitted within the channel bar and riveted thereto. For varying spacing of the chassis channels, the end metal 166 is machined away to seat against rib 36 and shoulder metal 165 is machined to snugly fit against the sides of the housing. The bolt holes are then drilled to suit the tapped holes in the housing bottom.

In operation, referring to Fig. 1, the loading and hauling position of the dump body is shown in full lines and in tilted dumping position in dot and dash lines. With the truck motor running, the transmission gear 31 drives gear 33, a shaft 25, coupling 27, shaft 24, coupling 26, and shaft 23 turning gear 78 freely or in neutral position. When desirable to dump the loaded truck, the lever 154 is manually pushed forward and through link 156 lever 153 is pushed rearward turning shaft 80 and a shaft stop notch 80' into engagement with spring pressed ball 60. The yoke 81 moves gear 78 from neutral into mesh with gear 81 turning gear 83 which meshes with and turns worm shaft gear 86, the worm gear 92 turning worm wheel 99 and pinion 111 idled on shaft 113. Pinion 111 turns idled gear 115 carrying pinion 117 which turns idled gear 120 carrying pinion 121 which turns gear 124, shaft 114 and rack pinions 20 and 21 moving racks 15 rearwardly against pivots 17 raising or tilting body 8. When the body is fully tilted hook 151 engages arm 155 throwing lever 153 and gear 78 into neutral position with a shaft notch 80' engaging ball 60 and disconnecting gear 78 from gear 81 as shown in Fig. 9, automatically stopping the movement of the racks. The worm 92 and worm wheel 99 act as an effective lock for the mechanism.

When the load has discharged the body is lowered by manually pulling lever 154 backward and through link 156 and lever 153 turning a shaft notch 80' into engagement with ball 60, the yoke 81 moving gear 78 into mesh with and turning gear 86 reversing the motion of the reduction gears and pinions 20 and 21 and moving the racks 15 forwardly. When the body is lowered to rest on the chassis stringers 7, rack arm 152 engages and moves lever 153 to neutral position, disengaging gear 78 from gear 86 and stopping the motion of the reduction gears.

As shown in Fig. 1 when the body is in normal horizontal position the rack pivot shafts are closely above the rack pinion and the rack ends are up close to the underside of the body providing ample road clearance while traveling. When the body is raised, the racks are above the supporting brackets allowing free travel of the truck over rough ground. The curvature of the racks is graduated from end to end and as the racks are fed over the pinions, the body of the racks pass over the supporting brackets without interference, requiring a minimum of space for the movement. The curvature of the racks, while maintaining the path of travel above the brackets, also shifts the point of engagement of the rack teeth with the teeth of the pinions keeping the thrust of the pinion teeth nearly at right angles to the body bottom during the hoisting action. The rack curvature also allows the body to be tilted to a relatively sharp angle insuring an evenly dumped load.

While I have shown and described one embodiment of the invention obviously various changes in the proportions and details of construction may be made without departing from the spirit and scope of the appended claims.

I claim:

1. The combination with a tilting vehicle body, of a rack and pinion gear for tilting the same, the rack comprising a hollow bar with internal rack teeth and a slot on the inner side, through which slot the pinion shaft projects, the pinion being enclosed within the bar, the bar having an internal guide track on the side opposite the slot, and the pinion shaft having a roller traveling on said track.

2. The combination of a tilting vehicle body and frame, racks and pinions for tilting the body, a gear for driving the pinions, a clutch controlling the gear, and a gear and clutch box mounted together on the frame, between the racks, the gear including a shaft projecting through opposite sides of the box and carrying the pinions at its opposite ends, the clutch being provided with a shifting lever including a rock shaft extending through the side of the box and having an arm at its outer end adapted to be engaged by projections on one of the rack bars, and a spring latch engaging the lever to hold it in shifted positions.

In testimony whereof, I do affix my signature.

WILLIAM N. BIRNEY.